United States Patent

Burl et al.

Patent Number: 5,953,079
Date of Patent: *Sep. 14, 1999

[54] MACHINE METHOD FOR COMPENSATING FOR NON-LINEAR PICTURE TRANSFORMATIONS, E.G. ZOOM AND PAN, IN A VIDEO IMAGE MOTION COMPENSATION SYSTEM

[75] Inventors: Michael Burl, Twickenham; Roderick Thomson, Chichester, both of United Kingdom

[73] Assignee: British Broadcasting Corporation, London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/745,986

[22] Filed: Nov. 8, 1996

Related U.S. Application Data

[63] Continuation of application No. 08/302,937, filed as application No. PCT/GB93/00600, Mar. 24, 1993, abandoned.

[30] Foreign Application Priority Data

Mar. 24, 1992 [GB] United Kingdom .................... 9206396

[51] Int. Cl.⁶ ........................................ H04N 7/32
[52] U.S. Cl. .............................. 348/699; 348/420
[58] Field of Search ...................... 348/384, 390, 348/409, 413, 416, 699, 402, 407, 420; 352/129; 382/232, 236, 238; H04N 7/137, 7/32

[56] References Cited

U.S. PATENT DOCUMENTS

| | | |
|---|---|---|
| 4,677,476 | 6/1987 | Kondo . |
| 5,008,746 | 4/1991 | Bernard et al. . |
| 5,083,860 | 1/1992 | Miyatake et al. ...................... 352/129 |
| 5,247,355 | 9/1993 | Frederiksen .......................... 348/416 |
| 5,259,040 | 11/1993 | Hanna .................................. 348/409 |
| 5,267,034 | 11/1993 | Miyatake et al. ...................... 348/416 |
| 5,357,287 | 10/1994 | Koo et al. ............................. 348/416 |
| 5,371,539 | 12/1994 | Okino et al. .......................... 348/416 |
| 5,376,971 | 12/1994 | Kadono et al. ....................... 348/416 |

FOREIGN PATENT DOCUMENTS

| | | |
|---|---|---|
| 0 509 208 A2 | 10/1992 | European Pat. Off. . |
| WO 92/00569 | 1/1992 | WIPO . |

OTHER PUBLICATIONS

M. Hoetter, "Differential Estimation of the Global Motion Parameters Zoom and Pan", *Signal Processing*, vol. 16, No. 3, Mar. 1989, pp. 249–265.

Primary Examiner—Richard Lee
Attorney, Agent, or Firm—Dike, Bronstein, Roberts & Cushman, LLP; George W. Neuner

[57] ABSTRACT

Non-linear picture transformations in a video image motion compensation system are caused by camera zooms or rotations. Sets of trial vectors are derived for each block of the image representing peak correlation values between adjacent images in the sequence. A constant representing the non-linear transformation is estimated using the sets of trial vectors and this enables a vector representing the non-linear transformation to be added to the trial vector list for each block.

12 Claims, 5 Drawing Sheets

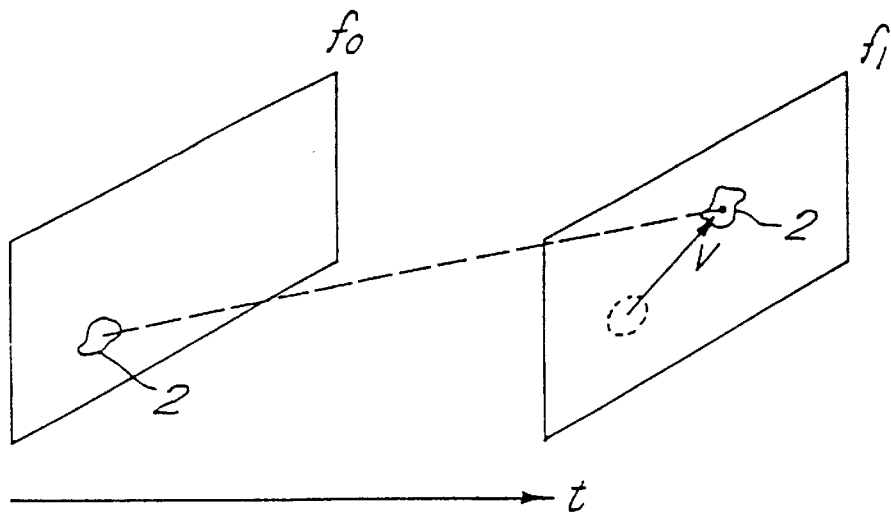
FIG.1
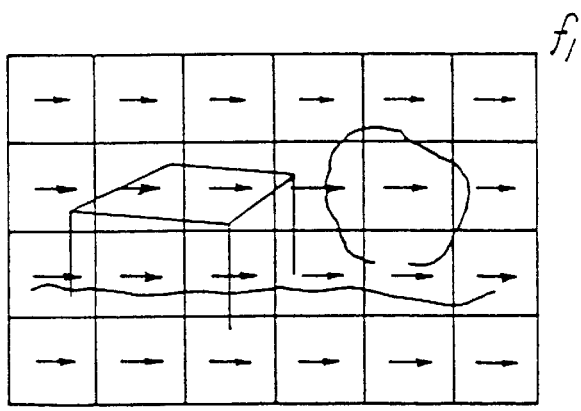
FIG.2
FIG.3
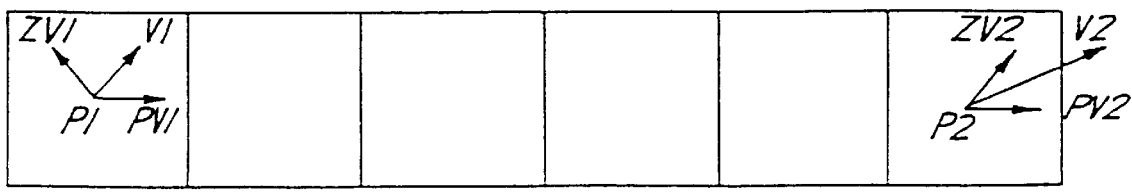

MACHINE METHOD FOR COMPENSATING FOR NON-LINEAR PICTURE TRANSFORMATIONS, E.G. ZOOM AND PAN, IN A VIDEO IMAGE MOTION COMPENSATION SYSTEM

This application is a continuation of application Ser. No. 08/302,937 filed on Mar. 3, 1995, now abandoned, which is a 371 of PCT/GB93/00600 filed Mar. 3, 1993.

FIELD OF THE INVENTION

This invention relates to video image motion measurement and in particular to such motion measurement when there is a camera zoom, rotation, or some other non-linear translation between adjacent fields of the video image.

BACKGROUND OF THE INVENTION

In our United Kingdom Patent No. GB-B-2188510 a method for TV picture motion measurement is described in which a plurality of motion vectors are derived for each of a plurality of measurement blocks of a picture and from these a list of motion vectors is derived which are applicable over the whole area of each block. The process is then repeated over the whole area of the picture. These vectors are derived using a phase correlation technique. One of these is then assigned to each elementary area of each block of the image. Other methods are also possible for generating such a list of motion vectors, for example the block matching technique described in European Patent Application No. EP-A-0395264. Each elementary area of a region of the picture to which a vector is assigned may be as small as a picture element (pixel) or it may comprise a plurality of picture elements for a block of the picture. The motion vectors thus derived may be used, for example, to generate output fields at instants in time intermediate of the time of two input fields. Such intermediate fields are required when producing slow motion effects, when transferring video images to or from film, or in standards conversion.

The methods used for deriving the motion vectors have been found to be highly satisfactory for stationary camera positions but have led to problems when a zoom of the camera is involved or a rotation of the camera about its viewing access. These problems have been particularly serious when such a zoom or rotation has been combined with a camera pan and the methods for deriving the motion vectors have in some cases broken down completely in these situations.

SUMMARY OF THE INVENTION

Preferred embodiments of the present invention seek to provide a machine method for extracting a motion component due to camera zoom or rotation from the gross movements in a scene. The component for each picture region will be proportional to the distance of that region from a particular point in the image. This is achieved by estimating a constant representing a non-linear transformation, from sets of trial vectors and then adding a vector defining the non-linear transformation to the trial vector list for each block.

The invention is defined in the appended claims to which reference should now be made.

BRIEF DESCRIPTION OF THE DRAWINGS

Preferred embodiments of the invention will now be described in detail by way of example with reference to the accompanying drawings in which:

FIG. 1 shows schematically the type of motion vector derived by a conventional TV picture motion measurement system;

FIG. 2 shows schematically the effect of a camera pan;

FIG. 3 shows the effect of a camera zoom on the top row of picture regions shown in FIG. 2;

DETAILED DESCRIPTION OF PREFERRED EMBODIMENTS

Figure 4:
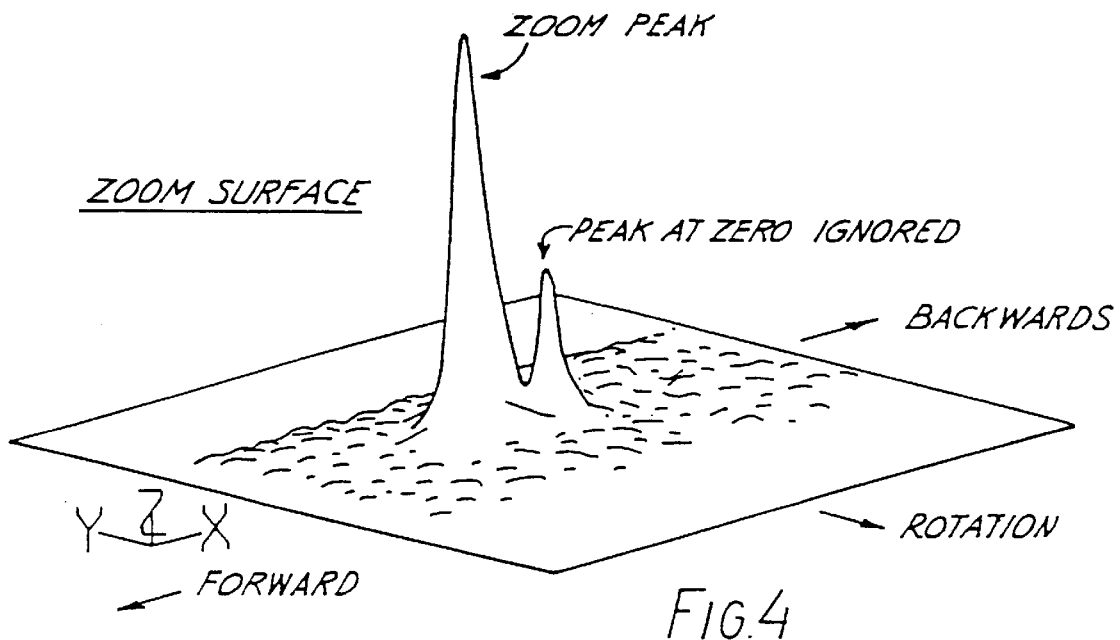
FIG. 4 and 5 show zoom and pan surfaces derived using an embodiment of the invention.

In FIG. 1 two adjacent frames of a television signal, F0 and F1, are shown schematically. These are separated by a time T. An object 2 is shown in both F0 and F1 and this object moves from a first position in F0 to a second position in F1. A TV picture motion measurement system of the type described in GB2188510 is used to analyse differences between F0 and F1 and this produces a vector V which describes the motion of the object 2 between the adjacent frames or fields.

In FIG. 2 a frame F1 is shown divided up into plurality of regions for which sets of trial motion vectors are derived by the motion measurement system. Typically 108 regions are used and a set of trial vectors is derived for each region. Preferably these regions overlap so that motion across boundaries can be more easily tracked. A camera pan has taken place between F0 and F1 and thus the motion measurement produces a translational vector in the trial vector set which is applied to each region of the image to define the camera pan. In addition to this, regions of the image which include movements of the type shown in FIG. 1 will include in their trial vector lists, vectors to define this type of movement, such that the motions of any foreground objects superimposed on the background pan action will be properly defined by the motion vectors when assigned to elementary areas. The pan vectors are background vectors to any motion in the scene.

It has been found that the pan vector can be easily derived for simple camera panning movements since this normally occurs in 60% or more of the blocks into which the TV pixel is divided. However, when a zoom is also involved a small amount of zoom will cause the derivation of the pan vector to fail.

In order to correct the system to take account of any camera zoom or rotation a rather more involved process has been devised in an embodiment of the present invention to extract a zoom component as well as any pan component from the vectors applied to a region of the picture.

Two vectors assigned to different blocks in a frame F1 of a sequence are derived from a comparison of the image in F1 with that in F0. These will represent general movement in the scene, and will comprise two components. One component due to pan will be a constant value over the whole picture and may be 0. The other component will be non-linear and may be due to zoom or rotation. This is a motion directed towards, away from, or rotationally about a point in the picture, usually the centre, with a value proportional to the distance from that point. A rotation about a non-central point can be defined as a pan plus a rotation about the centre.

In FIG. 3 the effect of a zoom on the top row of picture regions of FIG. 2 is illustrated. At P1 a background vector V1 is derived. This is comprised of a pan vector PV1 and a zoom vector ZV1. At P2 a second background vector V2 is derived. This comprises a pan vector PV2 (equal to PV1) and a zoom vector ZV2.

The points P1 and P2 are relative to the centre of the picture. This leads to a pair of simultaneous equations as follows:

$$V1 = \text{Pan\_vector} + \text{Zoom\_constant} * P1$$

$$V2 = \text{Pan\_vector} + \text{Zoom\_constant} * P2$$

Thus:

$$V1 - V2 = \text{Zoom\_constant} * P1 - \text{Zoom\_constant} * P2 \text{ and:}$$

$$\text{Zoom\_constant} = \frac{(V1 - V2)}{(P1 - P2)} \quad (1)$$

so that:

$$\text{Pan\_vector} = V1 - \text{Zoom\_constant} * P1.$$

An estimate of zoom constant is made using equation 1 by using every vector in a trial vector set for a region and comparing it in equation 1 with every vector in the trial vector sets of all the other regions in the image. From these it is possible to derive the zoom constant for the image as a whole whether or not there are any transient movements within the scene. This is done by deriving a map of the zoom constant for all the pairs of vectors in the scene and deriving the zoom constant to be the most commonly occurring value from this zoom map. Values derived will be random unless they correspond to a source object on which the zoom acts.

Once the sets of trial vectors have been derived, the whole analysis of the zoom and pan vectors can be summarised as follows:

a) Create a map of all possible zoom values with real and imaginary axes and set the map to zero.

b) Derive an estimate of zoom_constant from equation (1) for a pair of picture regions from the sets of trial vectors for those regions. This is repeated for all pairs of picture regions but not for vectors from the same block. Each estimate of the zoom constant is then plotted on the zoom map.

c) Filter the zoom map to give a smooth surface.

d) The zoom peak is taken to be the largest non-zero peak with a small imaginary component above a threshold. Imaginary components are due to camera rotations and are normally quite small.

e) For each block and vector in the original trial vector list, the zoom component is removed by subtracting the zoom_constant multiplied by the block location:

$$Vn\_\text{de-zoom} = Vn - Pn * \text{zoom\_constant}$$

If there is no zoom then Zoom-constant=0 and Vn_de-zoom=Vn.

f) Create a map of all possible pan values and set the map to zero.

g) Add a constant token in the pan map at a position corresponding to the value of Vn_de-zoom. Repeat for all Vn_de-zoom.

h) Filter the pan map to give a smooth surface and find the maximum value. Set a threshold equal to half the maximum.

i) The peaks in the pan surface corresponds to gross movements in the picture. Normally the largest non-zero peak above threshold is the pan. If a zero is the large peak and there are no others above threshold than pan=0.

j) Starting with the largest peak in the pan surface, calculate the pz_vector for each block and add it to the block if a suitable vector is not already there:

$$pz\_\text{vector}(n) = \text{pan\_vector} + \text{zoom\_constant} * Pn$$

CCD cameras tend to give a zero peak vector when no zoom is involved. This is thought to be because of background noise in the CCD cells. Thus in the presence of zoom it is unlikely to find more than one pan vector, but often two are found if there is no zoom. If the number of pan vectors is set at a large number it is still unlikely to add more than one or two vectors.

Figure 5:
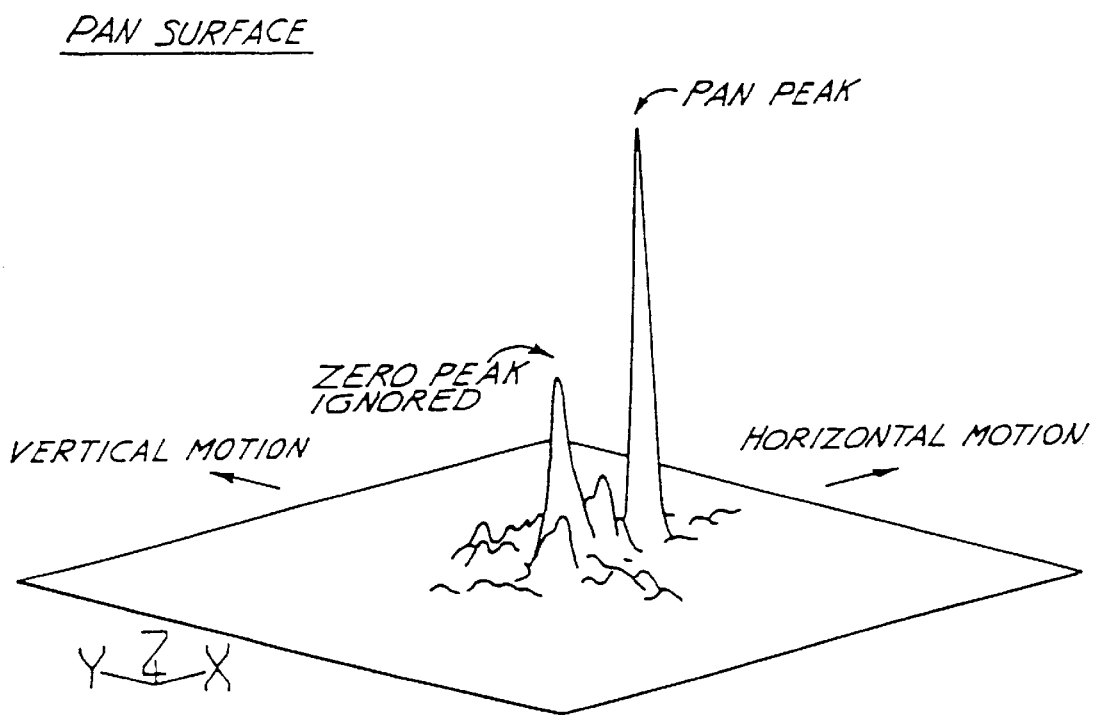
Figure 7:
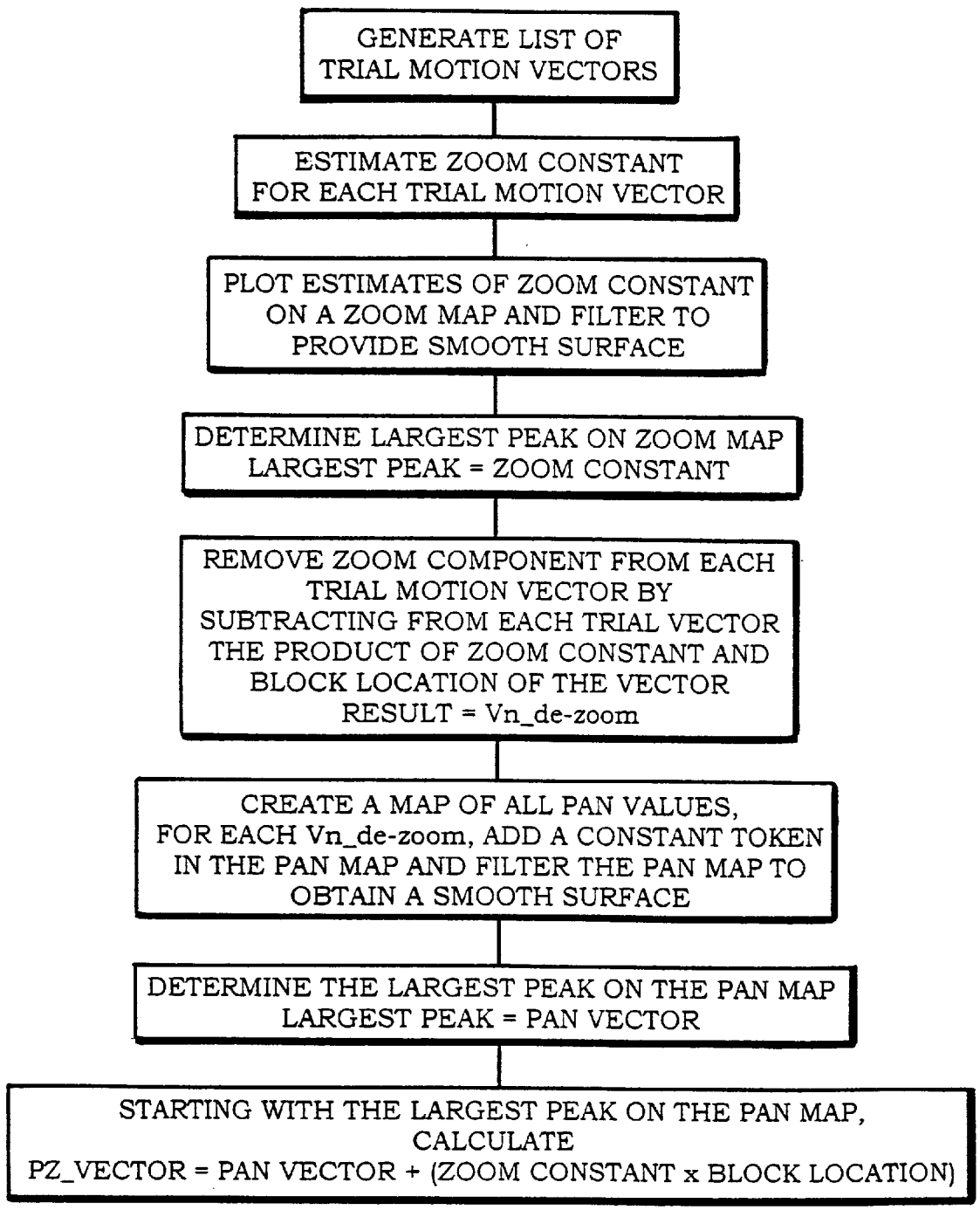
FIG. 7 is a schematic illustration of a process for extracting a motion component due to camera zoom in accord with a preferred embodiment of the present invention.

The zoom surface derived by the above steps is shown in FIG. 4 with the zoom peak indicated. The method described in the steps above is illustrated in FIG. 7. The x axis represents forwards and backwards movement of objects due to zoom, i.e. motion into and out of the screen as a result of zoom, whilst the y axis represents rotation. Similarly, the pan surface is shown in FIG. 5 with the largest non zero peak being the pan vector.

Using this method enables a combined zoom and pan vector to be added to the trial vector list for each region and vectors are then assigned to elementary areas of picture region. This leads to a vector assignment system which defines background motion more precisely and reduces errors close to foreground objects. This makes it much more straightforward to track background objects close to foreground objects within the scene and as result to assign the correct vector to an intermediate field derived at a time between F0 and F1.

An alternative method of finding the pan is to go through all the vectors after zoom correction and count the number of vectors that are within a small distance of the reference. The vector with the largest number of neighbours will be the pan or a gross motion.

It will be appreciated by a man skilled in the art that the method described herein can be implemented in computer software or in dedicated hardware in a well known manner. It is the actual steps of deriving the zoom and pan components of the image which are crucial to this particular embodiment of the invention rather than any particular hardware used to derive them.

Figure 6:
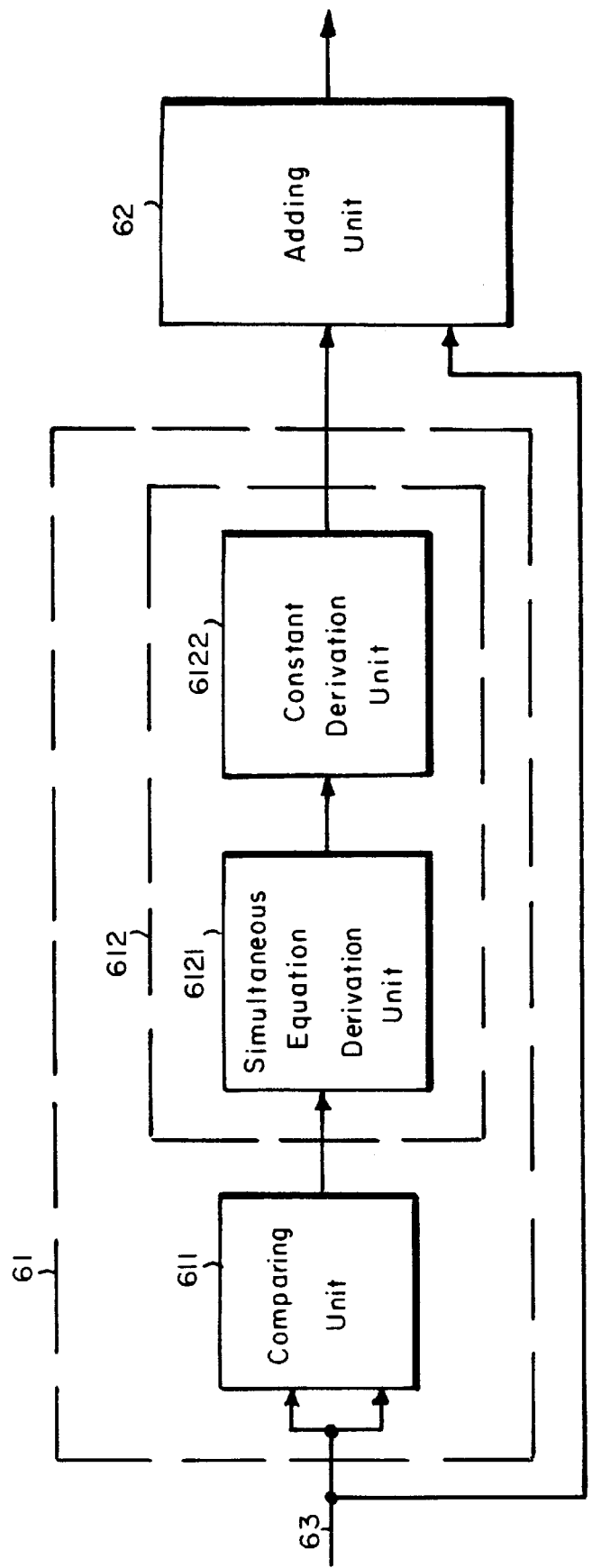
FIG. 6 shows a block diagram of an apparatus according to a preferred embodiment of the present invention.

For example, a block diagram such as shown in FIG. 6 could be implemented by the skilled artisan based on the above disclosure. Trial vectors are input on line 63 to an estimation unit 61, made up of a comparing unit 611 and constant estimation unit 612. Constant estimation unit 612 is in turn made up of simultaneous equation derivation unit 6121 and constant derivation unit 6122. The output of estimation unit 61 is supplied to an adding unit 62 which receives a second input from the trial vectors input on line 63.

To simplify the method for deriving pan and zoom vectors it has been proposed that rather than produce zoom and pan maps, a 1D plot could be used with real axes to derive the zoom constant. This would, of course, ignore any imaginary component due to camera rotation.

Figure 8:
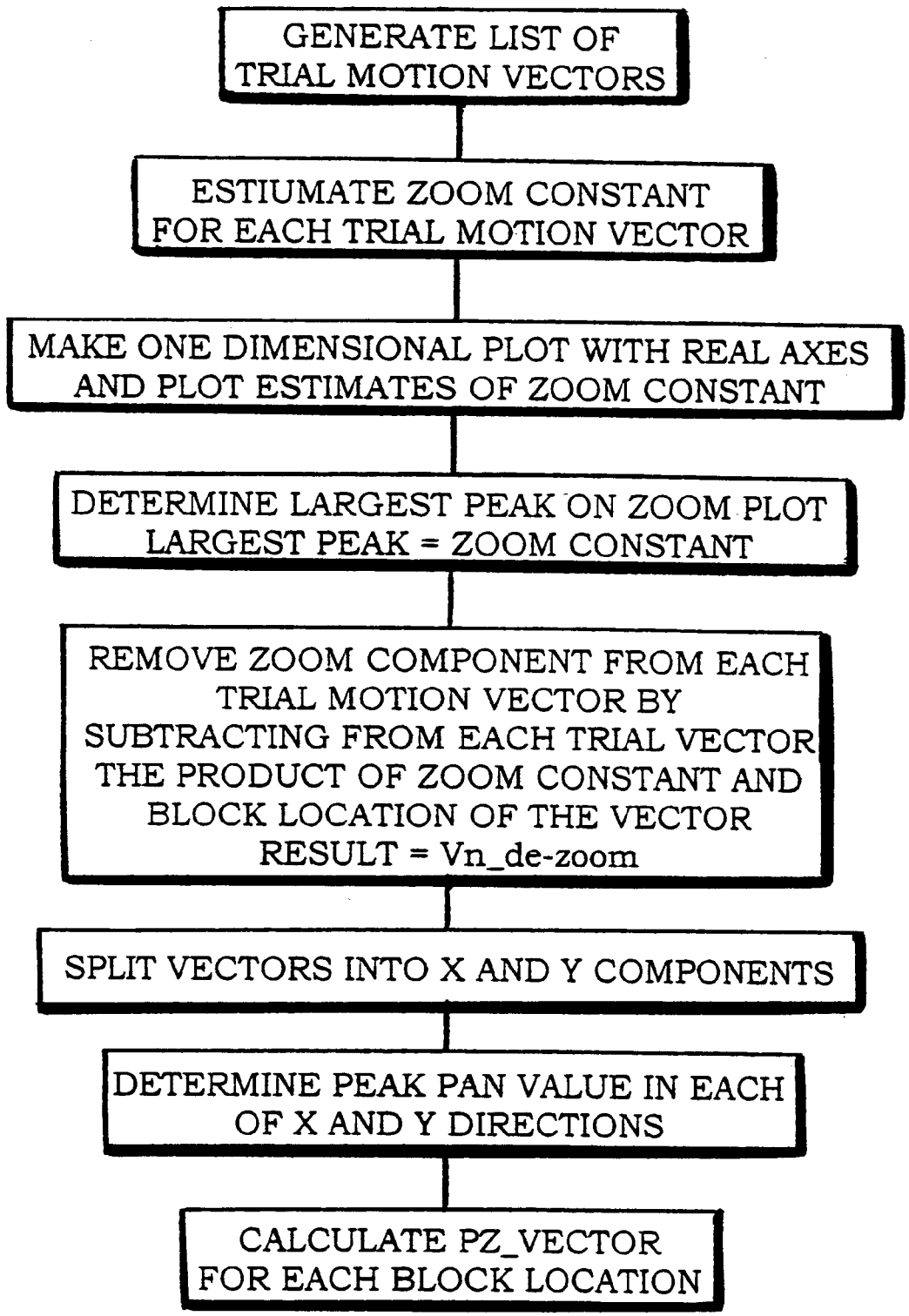
FIG. 8 is a schematic illustration of a simple process for extracting a motion component due to camera zoom in accord with a preferred embodiment of the present invention.

In this simplified implementation rotation in the zoom map of FIG. 4 is completely ignored and only motion due to zoom is plotted. As rotation usually only involves movements of one or two pixels no serious reduction in accuracy results. This simplified method is illustrated in FIG. 8.

For the pan analysis vectors are split into x and y components. The two components are then analysed separately for the vectors derived to produce a peak pan value in each of the x and y directions.

The processing power required to perform this simplified implementation is considerably less than that used for the full analysis. The processing power can be reduced further by ignoring the duplicated data produced by overlapping blocks.

We claim:

1. A machine method for compensating for non-linear picture transformations in a video image motion compensating system, in which a set of trial vectors is derived for each of a plurality of blocks, and in which each block is a region of a video frame, the method including:
   (a) mapping estimated values of zoom for all pairs of said trial vectors in said blocks;
      determining the location of a maximum of the values on said mapping, which location represents an estimated value for a zoom constant;
      subtracting, from each of said trial vectors in each of said blocks, a motion vector corresponding to a zoom component equal to said estimated value for the zoom constant multiplied by a block location of a trial vector, the results of the subtractions being vector values from which the zoom component has been removed; and
   (b) mapping said vector values for pan;
      determining the location of a maximum of the values on said mapping for pan, which location represents an estimated value for pan; and
      calculating new vectors for each block using the estimated values for both zoom and pan.

2. A method according to claim 1, wherein the location of said maximum which represents an estimated value for zoom is a complex number including a real component due to zoom and an imaginary component due to rotation.

3. A method according to claim 2, wherein said zoom is estimated from values of trial vectors in pairs of blocks using the equation $$\text{zoom\_constant} = \frac{(V1 - V2)}{(P1 - P2)}$$

wherein V1 and V2 are values of background vectors at points whose positions are P1 and P2 relative to the center of the picture, and zoom_constant is said complex number whose real part represents zoom and whose imaginary part represents rotation.

4. A video image motion compensating system for compensating for non-linear picture transformations in a video image motion compensating system, in which a set of trial vectors is derived for each of a plurality of blocks, and in which each block is a region of a video frame, the system including:
   mapping means for mapping estimated values of zoom for all pairs of said trial vectors in said blocks;
   determination means for determining a location of a maximum of the values on said mapping, which location represents an estimated value for a zoom constant;
   subtracting means for subtracting, from each of said trial vectors in each of said blocks, a motion vector corresponding to a zoom component equal to said estimated value for the zoom constant multiplied by a block location of a trial vector, the results of the subtractions being vector values from which the zoom component has been removed;
   said mapping means also being provided for mapping said estimated values and said determining means also being provided for determining the location of said maximum of said estimated values, which location represents an estimated value for pan; and
   calculating means for calculating new vectors for each block using said estimated values for zoom and pan.

5. A video image motion compensating system according to claim 4, wherein the location of said maximum which represents an estimated value for zoom is a complex number including a real component due to zoom and an imaginary component due to rotation.

6. A video image motion compensating system according to claim 5, wherein said zoom and rotation are estimated from values of trial vectors in pairs of blocks using the equation $$\text{zoom\_constant} = \frac{(V1 - V2)}{(P1 - P2)}$$

wherein V1 and V2 are values of background vectors at points whose positions are P1 and P2 relative to the center of the picture, and zoom_constant is said complex number whose real part represents zoom and whose imaginary part represents rotation.

7. A machine method for compensating for non-linear picture transformations in a video image motion compensating system, in which method a set of trial vectors is derived for each of a plurality of blocks, wherein each block is a region of a video frame, the method including:
   making a one dimensional plot of estimated values of one of said non-linear picture transformations for all pairs of said trial vectors in said blocks;
   determining the location of a maximum of the values on said plot, which location represents an estimated value for a component of said one of said non-linear picture transformations;
   subtracting, from each of said trial vectors in each of said blocks, a motion vector corresponding to the component of said one of said non-linear picture transformations equal to said estimated value multiplied by a block location of a trial vector, the results of the subtractions being vector values from which the component of said one of said non-linear picture transformations has been removed; and
   splitting said vector values into X and Y components, which are then analyzed separately to estimate the X and Y components for another one of said non-linear picture transformations; and
   calculating new vectors for each block using the estimated values for both of said non-linear picture transformations.

8. A method according to claim 7, wherein said non-linear picture transformations are zoom and pan.

9. A method according to claim 8, wherein said zoom is estimated from values of trial vectors in pairs of blocks using the equation $$\text{zoom\_constant} = \frac{(V1 - V2)}{(P1 - P2)}$$

wherein V1 and V2 are values of background vectors at points whose positions are P1 and P2 relative to the center of the picture, and zoom_constant is a complex number whose real part represents zoom and whose imaginary part is ignored.

10. A video image motion compensating system for compensating for non-linear picture transformations in a video image motion compensating system, in which a set of trial vectors is derived for each of a plurality of blocks, wherein each block is a region of a video frame, the system including:

plot making means for making a one dimensional plot of estimated values of one of said non-linear picture transformations for all pairs of said trial vectors in said blocks;

means for determining the location of a maximum of the values on said plot, said location representing an estimated value for a component of said one of said non-linear picture transformations;

subtracting means for subtracting, from each of said trial vectors in each of said blocks, a motion vector corresponding to the component of said one of said non-linear picture transformations equal to said estimated value multiplied by a block location of a trial vector, the results of the subtractions being vector values from which the component of said one of said non-linear picture transformations has been removed;

means for splitting said vector values into X and Y components, which are then analyzed separately to estimate the X and Y components for another one of said non-linear picture transformations; and calculating means for calculating new vectors for each block using estimated values for both of said non-linear picture transformations.

11. A video image motion compensating system according to claim 10, wherein said non-linear picture transformations are zoom and pan.

12. A video image motion compensating system according to claim 11, wherein said zoom is estimated from values of trial vectors in pairs of blocks using the equation $$\text{zoom\_constant} = \frac{(V1 - V2)}{(P1 - P2)}$$

wherein V1 and V2 are values of background vectors at points whose positions are P1 and P2 relative to the center of the picture, and zoom_constant is a complex number whose real part represents zoom and whose imaginary part is ignored.

* * * * *